(12) United States Patent
Pargeter et al.

(10) Patent No.: US 6,792,767 B1
(45) Date of Patent: Sep. 21, 2004

(54) CONTROLS FOR AIR CONDITIONER

(75) Inventors: Stephen J. Pargeter, Tulsa, OK (US); David Knebel, Tulsa, OK (US)

(73) Assignee: Aaon Inc., Tulsa, OK (US)

( * ) Notice: Subject to any disclaimer, the term of this patent is extended or adjusted under 35 U.S.C. 154(b) by 0 days.

(21) Appl. No.: 10/274,778

(22) Filed: Oct. 21, 2002

(51) Int. Cl.[7] .......................... F25B 29/00; F25B 49/00
(52) U.S. Cl. ......................... 62/173; 62/176.6; 62/186; 236/44 C
(58) Field of Search ................ 62/173, 176.6, 62/90, 186, 228.5, 229, 176.3; 236/44 C

(56) References Cited

U.S. PATENT DOCUMENTS

| | | | |
|---|---|---|---|
| 3,980,127 A | | 9/1976 | Sacks |
| 4,453,591 A | * | 6/1984 | Fehr .............................. 165/42 |
| 4,813,474 A | * | 3/1989 | Umezu ......................... 165/228 |
| 4,850,200 A | | 7/1989 | Sugiyama |
| 5,400,607 A | * | 3/1995 | Cayce ............................ 62/90 |
| 5,666,813 A | * | 9/1997 | Brune ............................ 62/90 |
| 6,055,818 A | * | 5/2000 | Valle et al. ................... 62/173 |
| 6,213,731 B1 | | 4/2001 | Doepker et al. |
| 6,269,650 B1 | | 8/2001 | Shaw |
| 6,386,281 B1 | | 5/2002 | Ganesh et al. |
| 6,427,454 B1 | * | 8/2002 | West ............................. 62/93 |
| 6,427,461 B1 | * | 8/2002 | Whinery et al. ........... 62/176.6 |
| 2002/0023443 A1 | | 2/2002 | Eber et al. |

* cited by examiner

Primary Examiner—Marc Norman
(74) Attorney, Agent, or Firm—Molly D. McKay

(57) ABSTRACT

A control system for a HVAC unit for controlling the humidity and temperature of interior building space at desired levels regardless of the outside temperature and humidity conditions. This system is more efficiently so that it operates with less energy consumption than current HVAC systems. The control system employs a combination of modulated return air bypass, modulated capacity compressor, and modulating hot gas reheat to maintain proper interior space humidity, and temperature while maintaining adequate ventilation within the interior building space. The system employs feed forward control to prevent overheating the interior building space with reheat and also, once humidity requirements are met, resets low pressure limit settings at the exit of the evaporator to minimize use of reheat in the operation of the unit.

15 Claims, 1 Drawing Sheet

CONTROLS FOR AIR CONDITIONER

BACKGROUND OF THE INVENTION

1. Field of the Invention

The present invention relates to a control system for an air conditioning unit for controlling the humidity and temperature of interior building space at desired levels regardless of the outside temperature and humidity conditions. More specifically, the present control system employs a combination of return air bypass, variable capacity compressor, and modulating hot gas reheat to maintain proper interior space humidity, and temperature while maintaining adequate ventilation within the interior building space. By combining these three control mechanisms, the system is also able to operate more efficiently and with less energy consumption.

2. Description of the Related Art

The present invention relates to a control system for an air conditioning unit for controlling the humidity and temperature of interior building space at desired levels regardless of the outside temperature and humidity conditions. Presently, there are no HVAC systems, with the exception of very large and expensive units that employ chilled and heated water, that are able to maintain both a desired temperature and a desired humidity in an interior building space. These existing units are used only in very limited applications because of the complexity of the systems and the cost.

With the increasing public awareness of the health problems associated with the occurrence of mold in interior building space, the need to control humidity in these spaces is becoming more urgent, particularly in public buildings such as schools. Typically, mold will grow inside a building when the humidity level is at or above 50% saturated. Mold grows particularly well when the humidity is above 50%. The ideal humidity for the interior of a building in order to prevent the growth of mold is approximately 45%. Current HVAC systems are unable to maintain humidity levels inside a building below 50% saturated under all outside temperature and humidity conditions. Some current HVAC systems employ reheat to try to achieve desired interior humidity levels, but the energy efficiency of the unit goes down when reheat is employed.

The present system is able to constantly maintain desired temperature and humidity levels inside a building space while maintaining adequate ventilation within the interior building space under any outside air conditions. The present invention does this by simultaneously employing a combination of modulated return air bypass, variable or modulated capacity compressor, and modulated hot gas reheat to simultaneously control the humidity and temperature. Also, the present invention operates in an efficient manner so that the present invention consumes less energy and operates at less expense than HVAC units that are not able to achieve this high degree of temperature and humidity control.

The present system provides linearly control in that the temperature and humidity of the interior building space remains constant. The system provides smooth, steady operational control, rather than having the humidity and temperature fluctuating up and down.

Also, the present system provides tight humidity control, maintaining the desired 45% humidity at all times within the interior building space.

In essence, the present invention is a dynamic control system that works so much better than current HVAC systems that it is able to accomplish what other HVAC systems can not do in the way of simultaneously controlling interior space temperature and humidity while maintaining adequate ventilation, and it does it at less cost than current units.

SUMMARY OF THE INVENTION

The present invention is a control system for a HVAC system that is capable of constantly maintaining desired temperature and humidity levels inside a building space while maintaining adequate ventilation within the interior building space under any outside air conditions. The present invention does this by simultaneously employing a combination of modulated return air bypass, variable or modulated capacity compressor, and modulated hot gas reheat to simultaneously control the humidity and temperature. These three controls are monitored and their operation is controlled by a controller that modulates their operation and the operation of the unit.

The controller monitors the temperature and humidity of the air of the interior building space. The controller modulates the compressor to control the temperature of the interior building space at the desired temperature set point, i.e. usually about 75 degree Fahrenheit. In order to control the humidity of the interior building space at the desired humidity set point, i.e. usually about 45% saturated, the controller first modulates the return air bypass damper as far as possible without allowing the evaporator coil from getting too cold as indicated by monitoring the suction pressure at the coolant exit of the evaporator and preventing the suction pressure from going below a low pressure limit. If this does not produce a humidity that satisfies the humidity set point, after the return air bypass damper is fully modulated, the controller next modulates the hot gas reheat to achieve the desired humidity control.

When reheat is employed, the system utilizes a temperature sensor in the supply air line to provide feed forward control to the compressor by sensing change in the temperature of the supply air before the temperature of the interior building space goes out of control. When the supply air temperature sensor sees an increase in temperature, the controller modulates up the compressor to increase the compressor's capacity to pump more coolant to the evaporator. Thus, both the feed forward control and the temperature sensor in the interior building space can serve as the basis on which the controller modulates the compressor to control the temperature of the interior building space.

Also, in order to save even more energy, once the system has satisfied the humidity set point for the interior building space, the system will reset the low pressure limit for suction pressure at the coolant exit of the evaporator, thereby minimizing the use of reheat. This allows the system to operate most efficiently by producing the highest leaving air temperature out of the evaporator while not going too high so that it does not properly dehumidify the air.

Also, the control monitors the pressure drop across the outside air damper and controls the return air damper and the outside air damper to insure that adequate outside air enters the HVAC system to maintain adequate ventilation in the interior building space. Alternately, instead of employing pressure drop across the outside air damper, the system can employ a carbon monoxide sensor located in the interior building space to regulate the amount of outside air entering the HVAC system in order to meet the oxygen demands of the occupants of the building.

The present invention operates in an efficient manner so that the present invention consumes less energy and operates at less expense than HVAC units that are not able to achieve this high degree of temperature and humidity control. In essence, the present invention works so much better than current HVAC systems that it is able to accomplish what other HVAC systems can not do in the way of simultaneously controlling interior space temperature and humidity, and it does it at less cost.

DETAILED DESCRIPTION OF THE PREFERRED EMBODIMENT

The Invention

Figure 1:
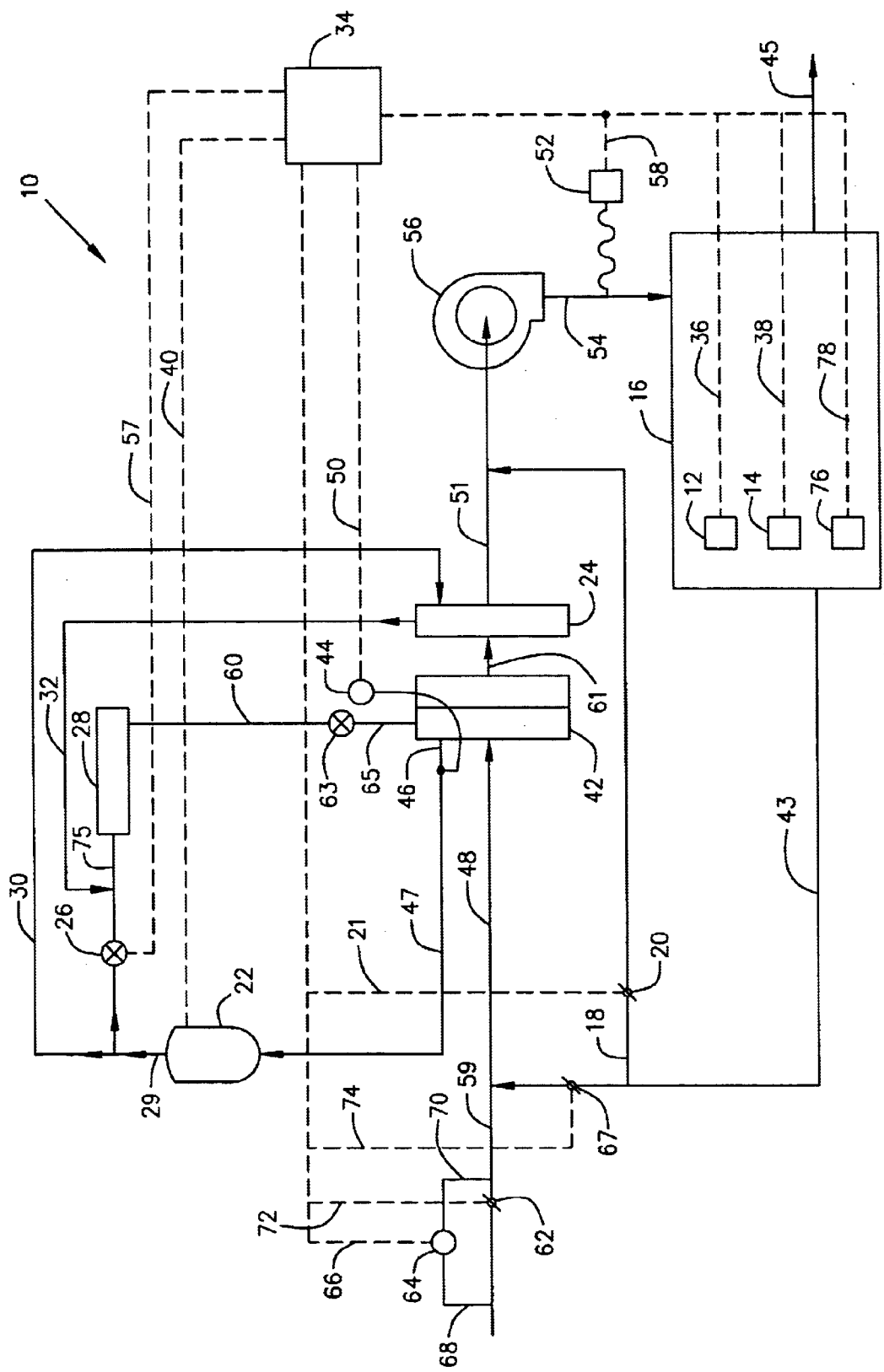
FIG. 1 is a diagram showing a HVAC system employing a control system according to a preferred embodiment of the present invention.

Referring now to FIG. 1, there is illustrated a control system 10 in for a HVAC system constructed in according to a preferred embodiment of the present invention. This invention is a HVAC system with controls for optimum control of space humidity and temperature. The control system 10 is capable of constantly maintaining desired temperature as monitored by temperature sensor 12 and humidity levels as monitored by humidity sensor 14 inside a building space 16 while maintaining adequate ventilation within the interior building space 16 under any outside air conditions. The present invention does this by simultaneously employing a combination of modulated return air bypass via a return air bypass line 18 provided with a modulated return air bypass damper 20, variable output or modulated capacity compressor 22, and hot gas reheater 24 modulated by hot gas reheat valve 26 located in the hot gas line 29 feeds hot gas from the compressor 22 to both the reheater 24, i.e. via hot gas lines 30 and 32, and the condenser 28, i.e. via hot gas line 29. Together these three major control mechanisms 20, 22, and 24 serve to simultaneously control the humidity and temperature in the interior building space 16. These three controls 20, 22, and 24 are monitored and their operation is controlled by a controller 34 that modulates their operation and the entire operation of the HVAC unit.

The controller 34 monitors the temperature of the air of the interior building space 16 via line 36 which connects the temperature sensor 12 to the controller 34. The controller 34 also monitors the humidity of the air of the interior building space 16 via line 38 which connects the humidity sensor 14 to the controller 34. The controller 34 is connected to the compressor 22 via control line 40 and modulates the compressor 22 to control the temperature of the interior building space 16 at the desired temperature set point, i.e. usually about 75 degrees Fahrenheit. The compressor 22 is preferably a modulated compressor such as, for example, the digital scroll type modulated compressor available from Copeland Corporation of Sidney, Ohio.

In order to control the humidity of the interior building space 16 at the desired humidity set point, i.e. usually about 45% saturated, the controller 34 first begins by modulating the return air bypass damper 20, via control line 21 which connects the controller 34 to the return air bypass damper 20, so that more return air flows via return air bypass line 18 around and bypasses an evaporator 42 and the reheater 24. As shown in the drawing, the return air flows from the interior building space 16 via return air line 43 to both the return air damper 67 and the return air bypass damper 20. Excess air is exhausted from the interior building space 16 via exhaust line 45.

The controller 34 continues to modulate the return air bypass damper 20 until it has opened the damper 20 as far as possible without allowing the evaporator coil 42 from getting too cold, as indicated by monitoring the suction pressure measured by suction pressure sensor 44 located at the coolant exit 46 of the evaporator 42. As shown in the drawing, coolant exiting the evaporator 42 flows through line 47 to return to the compressor 22. If the evaporator coil 42 becomes too cold due to decreased flow of mixed air passing through it, as supplied by mixed air line 48, the suction pressure of the coolant at suction pressure sensor 44 drops below a low suction pressure limit. The controller 34 receives this information via line 50 that extends between the suction pressure sensor 44 and the controller 34 either opens or closes the return air bypass damper 20 to maintain the suction pressure limit value.

If modulation of the return air bypass damper 20 does not produce a humidity within the interior building space 16 that satisfies the humidity set point, after the return air bypass damper 20 is fully modulated, the controller 34 next modulates the reheat going to the hot gas reheater 24 via lines 30 and 32 by modulating the opening or closing of hot gas reheat valve 26 to achieve the desired humidity control. Control line 57 connects the controller 34 with the hot gas reheat valve 26. As shown in the drawing, the reheater 24 receives dehumidified and cooled air from the evaporator 42 via line 61 and that same air stream flows out of the reheater 24 via line 51 which carries the air to the supply air fan 56. The return air bypass line 18 joins with line 51 at a point between the reheater 24 and the supply air fan 56.

When reheat is employed, the system utilizes a supply air temperature sensor 52 located in the supply air line 54 that runs from the supply air fan 56 to the interior building space 16. This supply air temperature sensor is connected via line 58 to the controller to provide feed-forward control to the compressor 22 by sensing an increase in the temperature of the supply air within the supply air line 54 before the temperature of the interior building space 16, as sensed by the temperature sensor 12, goes out of control.

When the supply air temperature sensor 52 senses an increase in temperature, the controller 34 modulates up the compressor 22 to increase the compressor's capacity to pump more coolant to the evaporator 42. Coolant from the compressor 22 travels via hot gas lines 29 and 75 to the condenser 28, then via coolant line 60 to a coolant expansion valve 63, and from there via coolant line 65 to the evaporator 42. Hot gas line 75 connects the hot gas reheat valve 26 to the condenser 28. Thus, both the temperature sensor 12 in the interior building space 16 and the feed-forward control provided jointly by. the controller 34 and the supply air temperature sensor 52 can serve as the basis on which the controller 34 modulates the compressor 22 to control the temperature of the interior building space 16.

Also, in order to save even more energy, once the system has satisfied the humidity set point for the interior building space 16, the controller 34 will reset the low pressure limit for suction pressure as measured by the suction pressure sensor 44 located at the coolant exit 46 of the evaporator 42, thereby minimizing the use of reheat in the reheater 24. This allows the system to operate most efficiently by producing the highest leaving air temperature flowing out of the evaporator 42 via line 61 while not allowing the air temperature in line 61 to go too high so that it does not properly dehumidify the air in the evaporator 42

Also, the controller 34 monitors the pressure drop in the outside air line 59 as the outside air passes through the outside air damper 62. The pressure drop across the outside air damper 62 is measured by pressure sensor 64 located at the outside air damper 62. The pressure sensor 64 measures the difference between the pressure of the outside air, as supplied to the pressure sensor 64 by line 68, and the pressure of the air stream after it has passed through the outside air damper, as supplied to the pressure sensor 64 by line 70 that connects to the outside air line 59.

After the outside air has passed through the outside air damper, it flow through outside air line 59 until it mixes with the return air from line 43 that has passed through the return air damper 67. These two air stream mix together to form the mixed air stream, and the mixed air stream flows via mixed air line 48 to the evaporator 42. A line 66 extends between the pressure sensor 64 and the controller 34 so that the controller 34 receives information from the pressure sensor 64 regarding any pressure drop across the outside air damper 62.

A decrease in pressure sensed by the pressure sensor 64 is indicative of a decrease in the volume of oxygen laden outside air entering the unit. In order to maintain proper ventilation, i.e. proper oxygen levels for the occupants of the interior building space 16, it is desirable to maintain a constant volume of outside air entering the unit. A constant volume of outside flowing into the unit is maintained by the controller 34 modulating the opening and closing of the return air damper 67 and the outside air damper 62 to insure that a constant volume of outside air enters the HVAC unit via mixed air line 48.

An alternate method for maintaining adequate oxygen levels in the interior building space is to respond to a carbon monoxide sensor 76 provided in the interior building space 16 rather than pressure drop as indicated by pressure sensor 64, thereby only using enough oxygen laden fresh outside air required by the occupants of the space. As shown in the drawing, the carbon monoxide sensor 76 is connected to the controller by line 78 and provides information to the controller on the level of carbon monoxide in the interior building space.

Thus, as the return air bypass increases, there is less negative pressure or suction through the evaporator 42, and therefore, less outside air coming into the unit. To maintain constant flow of outside air into the unit, the controller 34 simultaneously modulates up the outside air damper 62 and modulates down the return air damper 67. Control line 72 connects the controller 34 to the outside air damper 62, and control line 74 connects the controller 34 to the return air damper 67 to enable the controller 34 to modulate the dampers 62 and 67 in conjunction with each other.

The system 10 is constantly modulating its controls in a dynamic manner to maintain proper temperature, humidity and ventilation while operating at the most cost effective manner by employing a minimum amount of reheat.

The present system 10 operates in an efficient manner so that it consumes less energy and operates at less expense than HVAC units that are not able to achieve this high degree of temperature and humidity control. In essence, the present system 10 works so much better than current HVAC systems that it is able to accomplish what other HVAC systems can not do, i.e. simultaneously maintaining desired temperature, humidity, and ventilation control for an interior building space 16 over all outside air conditions, and it operates at less cost than other HVAC systems.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. Controls for an air conditioner comprising:

a modulated capacity compressor for pumping varying amounts of coolant through a coolant circuit of an air conditioner, modulated return air bypass damper for varying the amount of return air bypassing an evaporator of the air conditioner, a modulated reheater provided adjacent the evaporator for adding reheat to an air stream after the air stream passes through the evaporator, a controller attached to and controlling modulation of the compressor, said controller attached to and controlling the return air bypass damper, and said controller attached to and controlling modulation of a valve that modulates the reheater, said controller attached to and receiving information from a temperature sensor that senses air temperature of conditioned space air produced by the air conditioner, said controller controlling modulation of the compressor to maintain a desired temperature in the conditioned space air, and said controller attached to and receiving information from a humidity sensor that senses air humidity of conditioned space air produced by the air conditioner, and said controller first modulating the return air bypass damper to maintain a desired humidity in the conditioned space air and then said controller second also modulating the reheat valve to control flow of hot coolant gas to the reheater to maintain the desired humidity in the conditioned space air.

2. Controls for an air conditioner comprising:

a modulated capacity compressor for pumping varying amounts of coolant through a coolant circuit of an air conditioner, modulated return air bypass damper for varying the amount of return air bypassing an evaporator of the air conditioner, a modulated reheater provided adjacent the evaporator for adding reheat to an air stream after the air stream passes through the evaporator, a controller attached to and controlling modulation of the compressor, said controller attached to and controlling the return air bypass damper, said controller attached to and controlling modulation of a valve that modulates the reheater, said controller attached to and receiving information from a temperature sensor that senses air temperature of conditioned space air produced by the air conditioner, said controller controlling modulation of the compressor to maintain a desired temperature in the conditioned space air, said controller attached to and receiving information from a humidity sensor that senses air humidity of conditioned space air produced by the air conditioner, and said controller first modulating the return air bypass damper to maintain a desired humidity in the conditioned space air and then said controller second also modulating the reheat valve to control flow of hot coolant gas to the reheater to maintain the desired humidity in the conditioned space air, an air intake sensor for sensing flow of outside air intake provided at an outside air intake damper of the air conditioner, said controller attached to and receiving outside air intake flow information from said air intake sensor, and said controller operating the outside air damper and a return air damper provided on the return air line of the air conditioner to maintain a constant volume of outside air flow through the outside air intake damper.

3. Controls for an air conditioner comprising:

a modulated capacity compressor for pumping varying amounts of coolant through a coolant circuit of an air conditioner, modulated return air bypass damper for varying the amount of return air bypassing an evaporator of the air conditioner, a modulated reheater provided adjacent the evaporator for adding reheat to an air stream after the air stream passes through the evaporator, a controller attached to and controlling modulation of the compressor, said controller attached to and controlling the return air bypass damper, said controller attached to and controlling modulation of a valve that modulates the reheater, said controller attached to and receiving information from a temperature sensor that senses air temperature of conditioned space air produced by the air conditioner, said controller controlling modulation of the compressor to maintain a desired temperature in the conditioned space air, said controller attached to and receiving information from a humidity sensor that senses air humidity of conditioned space air produced by the air conditioner, and said controller first modulating the return air bypass damper to maintain a desired humidity in the conditioned space air and then said controller second also modulating the reheat valve to control flow of hot coolant gas to the reheater to maintain the desired humidity in the conditioned space air, a carbon monoxide sensor for sensing the carbon monoxide level in the conditioned space air, said controller attached to and receiving carbon monoxide level information from said carbon monoxide sensor, and said controller operating the outside air damper and a return air damper provided on the return air line of the air conditioner to maintain adequate outside air flow through the outside air intake damper.

4. Controls for an air conditioner comprising:

a modulated capacity compressor for pumping varying amounts of coolant through a coolant circuit of an air conditioner, modulated return air bypass damper for varying the amount of return air bypassing an evaporator of the air conditioner, a modulated reheater provided adjacent the evaporator for adding reheat to an air stream after the air stream passes through the evaporator, a controller attached to and controlling modulation of the compressor, said controller attached to and controlling the return air bypass damper, said controller attached to and controlling modulation of a valve that modulates the reheater, said controller attached to and receiving information from a temperature sensor that senses air temperature of conditioned space air produced by the air conditioner, said controller controlling modulation of the compressor to maintain a desired temperature in the conditioned space air, said controller attached to and receiving information from a humidity sensor that senses air humidity of conditioned space air produced by the air conditioner, and said controller first modulating the return air bypass damper to maintain a desired humidity in the conditioned space air and then said controller second also modulating the reheat valve to control flow of hot coolant gas to the reheater to maintain the desired humidity in the conditioned space air, a suction pressure sensor provided at a coolant exit from the evaporator for sensing pressure of the evaporator, said controller attached to and receiving pressure information from said suction pressure sensor, and said controller operating the return air bypass damper to maintain pressure at the suction pressure sensor above a predetermined low pressure set point.

5. Controls for an air conditioner according to claim 4 further comprising:

an air intake sensor for sensing flow of outside air intake provided at an outside air intake damper of the air conditioner, said controller attached to and receiving outside air intake flow information from said air intake sensor, and said controller operating the outside air damper and a return air damper provided on the return air line of the air conditioner to maintain a constant volume of outside air flow through the outside air intake damper.

6. Controls for an air conditioner according to claim 5 further comprising:

a supply air temperature sensor provided in a supply air line of the air conditioner, said controller attached to and receiving information from the supply air temperature sensor, and said controller modulating the compressor as a feed-forward control so that the compressor supplies more coolant to the evaporator.

7. Controls for an air conditioner according to claim 5 further comprising:

said controller sensing when a desired humidity has been attained in the conditioned space air and resetting the low pressure limit set point for suction pressure at the suction pressure sensor so that the air conditioner operates most efficiently by minimizing use of reheat.

8. A dynamic control system for controlling the operation of an air conditioner comprising:

a controller attached to and controlling operation of a modulated capacity compressor capable of pumping varying amounts of coolant through a coolant circuit of an air conditioner, said controller attached to and controlling operation of a return air bypass damper that modulates the amount of return air bypassing the evaporator of the air conditioner, said controller attached to and controlling modulation of a valve that modulates the reheater that is provided adjacent the evaporator and adds heat to an air stream after the air stream passes through the evaporator, said controller attached to and receiving information from a temperature sensor that senses air temperature of conditioned space air produced by the air conditioner, said controller attached to and receiving information from a humidity sensor that senses air humidity of conditioned space air produced by the air conditioner, and said controller first modulating the return air bypass damper as much as possible to maintain a desired humidity in the conditioned space air, and then said controller second modulating the reheat valve to control flow of hot coolant gas to the reheater to maintain the desired humidity in the conditioned space air.

9. A dynamic control system for controlling the operation of an air conditioner according to claim 8 further comprising:

said controller controlling modulation of the compressor to maintain a desired temperature in the conditioned space air.

10. A dynamic control system for controlling the operation of an air conditioner comprising:

a controller attached to and controlling operation of a modulated capacity compressor capable of pumping varying amounts of coolant through a coolant circuit of an air conditioner, said controller attached to and controlling operation of a return air bypass damper that modulates the amount of return air bypassing the evaporator of the air conditioner, said controller attached to and controlling modulation of a valve that modulates the reheater that is provided adjacent the evaporator and adds heat to an air stream after the air stream passes through the evaporator, said controller attached to and receiving information from a temperature sensor that senses air temperature of conditioned space air produced by the air conditioner, said controller attached to and receiving information from a humidity sensor that senses air humidity of conditioned space air produced by the air conditioner, said controller first modulating the return air bypass damper as much as possible to maintain a desired humidity in the conditioned space air, and then said controller second modulating the reheat valve to control flow of hot coolant gas to the reheater to maintain the desired humidity in the conditioned space air, said controller controlling modulation of the compressor to maintain a desired temperature in the conditioned space air, a suction pressure sensor provided at a coolant exit from the evaporator for sensing pressure of the evaporator, said controller attached to and receiving pressure information from said suction pressure sensor, and said controller operating the return air bypass damper to maintain pressure at the suction pressure sensor above a predetermined low pressure set point.

11. A dynamic control system for controlling the operation of an air conditioner according to claim 10 further comprising:

an air intake sensor for sensing flow of outside air intake provided at an outside air intake damper of the air conditioner, said controller attached to and receiving outside air intake flow information from said air intake sensor, and said controller operating the outside air damper and a return air damper provided on the return air line of the air conditioner to maintain a constant volume of outside air flow through the outside air intake damper.

12. A dynamic control system for controlling the operation of an air conditioner according to claim 11 further comprising:

an air intake sensor for sensing flow of outside air intake provided at an outside air intake damper of the air conditioner, said controller attached to and receiving outside air intake flow information from said air intake sensor, and said controller operating the outside air damper and a return air damper provided on the return air line of the air conditioner to maintain a constant volume of outside air flow through the outside air intake damper.

13. A dynamic control system for controlling the operation of an air conditioner according to claim 12 further comprising:

a supply air temperature sensor provided in a supply air line of the air conditioner, said controller attached to and receiving information from the supply air temperature sensor, and said controller modulating the compressor as a feed-forward control so that the compressor supplies more coolant to the evaporator.

14. A dynamic control system for controlling the operation of an air conditioner according to claim 13 further comprising:

said controller sensing when a desired humidity has been attained in the conditioned space air and resetting the low pressure limit set point for suction pressure at the suction pressure sensor so that the air conditioner operates most efficiently by minimizing use of reheat.

15. Controls for an air conditioner according to claim 10 further comprising:

a carbon monoxide sensor for sensing the carbon monoxide level in the conditioned space air, said controller attached to and receiving carbon monoxide level information from said carbon monoxide sensor, and said controller operating the outside air damper and a return air damper provided on the return air line of the air conditioner to maintain adequate outside air flow through the outside air intake damper.

* * * * *